Figure 1:
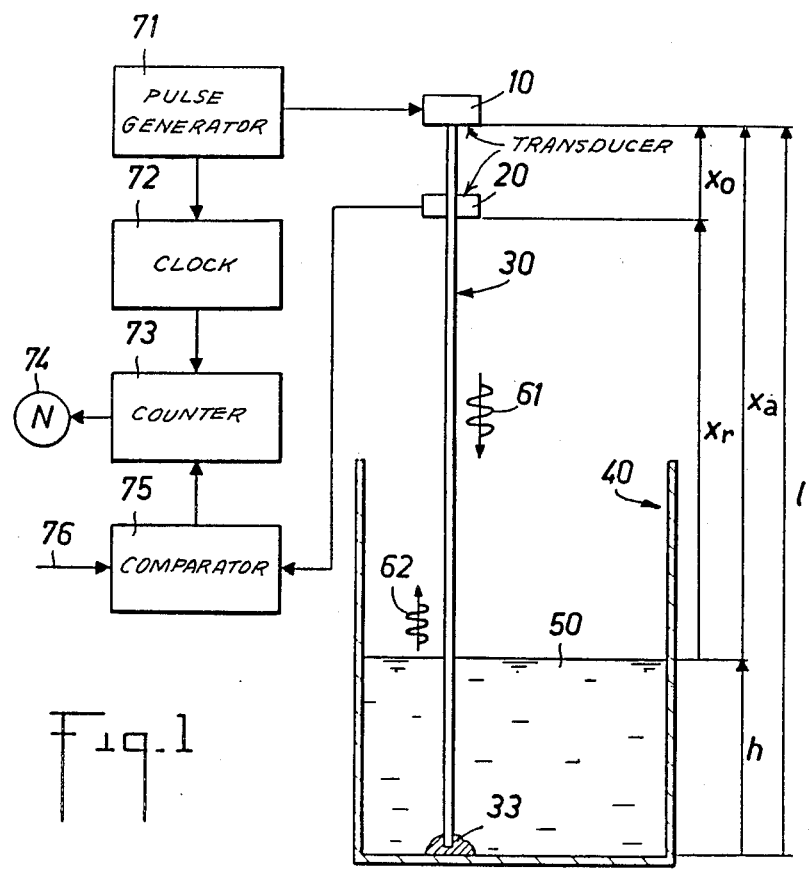

United States Patent [19]
Dieulesaint et al.

[11] Patent Number: 4,765,186
[45] Date of Patent: Aug. 23, 1988

[54] LIQUID LEVEL DETECTOR BY GUIDED ELASTIC WAVES

[75] Inventors: Eugène Dieulesaint, Saint-Maur; Daniel Royer, Sainte Genevieve des Bois, both of France

[73] Assignee: Universite Pierre et Marie Curie, Paris Cedex, France

[21] Appl. No.: 31,114

[22] Filed: Mar. 25, 1987

[30] Foreign Application Priority Data

Mar. 28, 1986 [FR] France ................................. 86 04532

[51] Int. Cl.$^4$ ............................................. G01F 23/28
[52] U.S. Cl. .................................. 73/290 V; 367/908; 181/124
[58] Field of Search ............. 73/290 V; 367/908, 140, 367/141, 155, 157, 160; 181/124, 161, 402

[56] References Cited

U.S. PATENT DOCUMENTS

| 2,713,263 | 7/1955 | Turner ............................... 73/290 V |
| 3,080,752 | 3/1963 | Rich ..................................... 367/908 |
| 3,100,994 | 8/1963 | Juneer ............................... 73/290 V |
| 3,113,456 | 12/1963 | Smith, Jr. et al. .................. 367/908 |
| 3,163,843 | 12/1964 | Dieckamp ......................... 73/290 V |
| 3,208,281 | 9/1965 | Kalmus et al. ................... 73/290 V |
| 3,222,929 | 12/1965 | Kalmus et al. ................... 73/290 V |
| 3,372,592 | 3/1968 | Gravert ............................. 73/290 V |
| 3,394,589 | 7/1968 | Tomioka . |
| 3,656,134 | 4/1972 | Brown . |
| 3,975,958 | 8/1976 | Hope ................................. 73/290 V |
| 4,213,337 | 7/1980 | Langdon .......................... 73/290 V |
| 4,675,660 | 6/1987 | Boscolo ............................ 73/290 V |

FOREIGN PATENT DOCUMENTS

| 543420 | 4/1985 | Australia . |
| 2402861 | 4/1979 | France . |
| 0202311 | 10/1985 | Japan ................................. 73/290 V |
| 2152667 | 1/1984 | United Kingdom ............. 73/290 V |

OTHER PUBLICATIONS

Electronic Engineering, vol. 53, No. 659, Nov. 1981, pp. 159–168.

Primary Examiner—Steven L. Stephan
Assistant Examiner—Thomas B. Will
Attorney, Agent, or Firm—Mason, Fenwick & Lawrence

[57] ABSTRACT

The liquid level detector using guided waves, comprises a first transducer situated out of the liquid for sending an incident elastic pulse which propagates in an elongated guide of which the lower part is immersed in the liquid, a second transducer situated out of the liquid and receiving the elastic pulse sent by the first transducer and transmitted by the guide, and electronic circuits for measuring the time elapsing between the transmission of an incident elastic pulse by the first transducer and the subsequent reception of the same elastic wave by the second transducer. The elongated guide comprises at least one smooth tube having no roughness in the longitudinal direction, the second transducer is situated in a fixed position close to the first transducer so as to receive the elastic pulse delivered by the first transducer after reflection thereof on the surface of the liquid in which is immersed the lower part of the guide, and the first transducer is arranged in such a manner with respect to the guide that periodical radial deformations of the tube are antisymmetrically created essentially in a first axial plane of the guide whereas the radial deformations created in a second axial plane of the guide perpendicular to the first axial plane are substantially equal to zero.

12 Claims, 6 Drawing Sheets

U.S. Patent    Aug. 23, 1988    Sheet 1 of 6    4,765,186

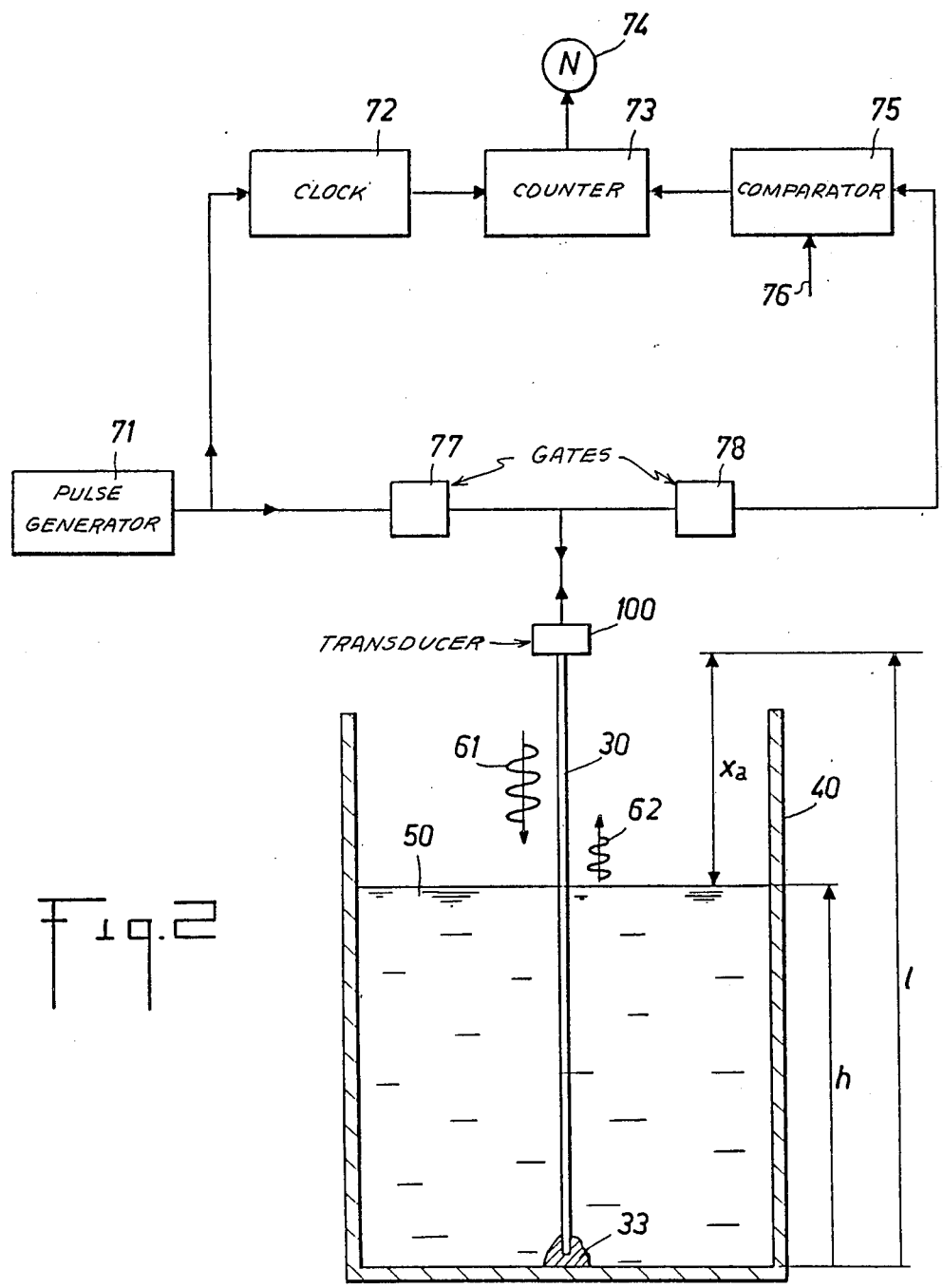

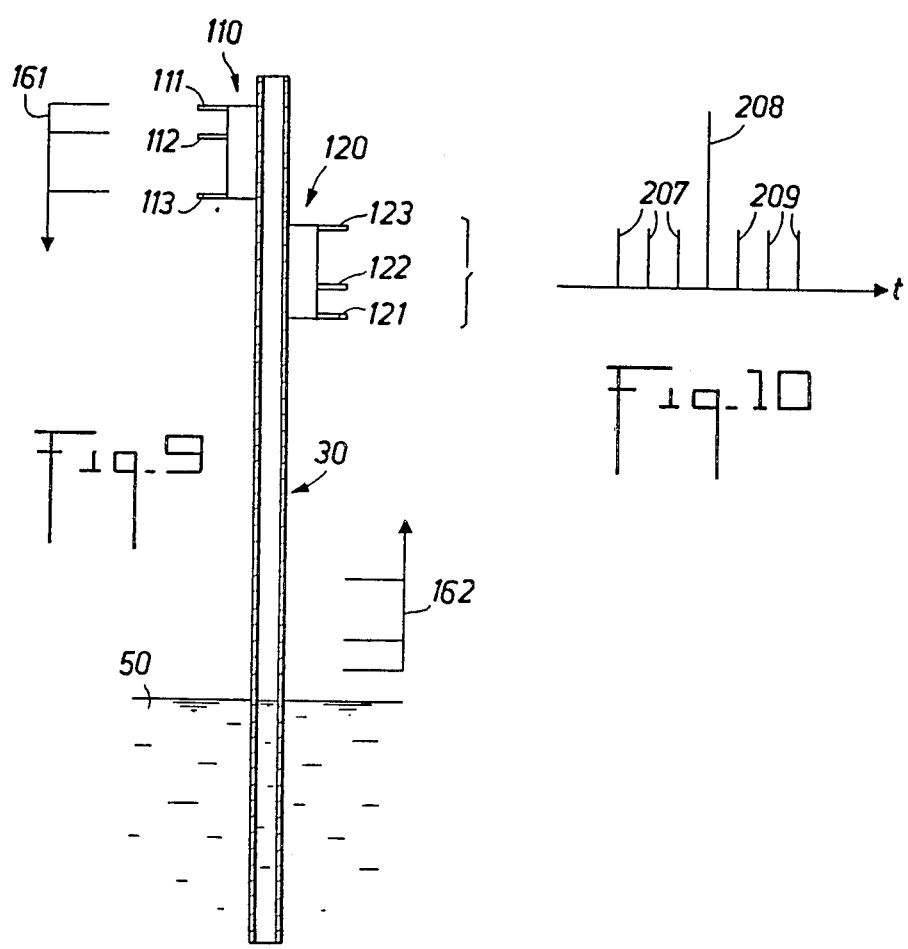

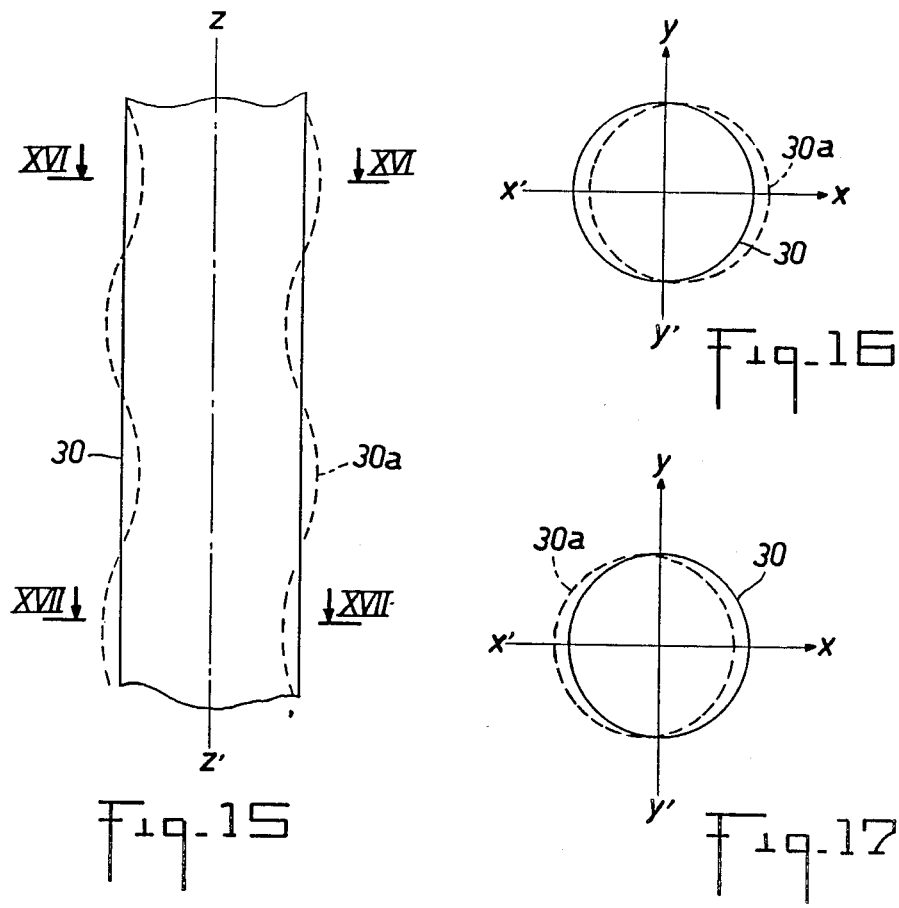
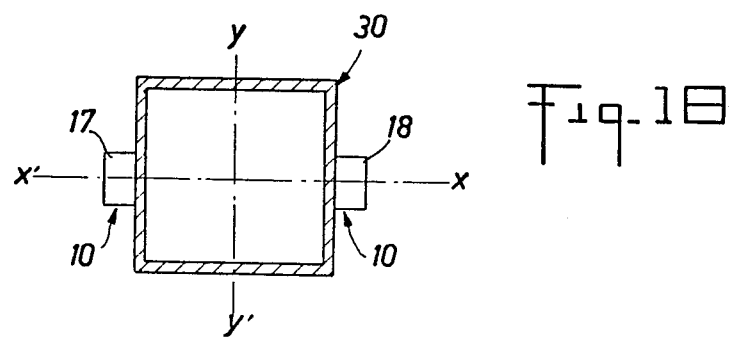

LIQUID LEVEL DETECTOR BY GUIDED ELASTIC WAVES

The present invention relates to a liquid level detector using guided elastic waves, comprising a first transducer situated out of the liquid for sending an incident elastic pulse which propagates in an elongated guide of which the lower part is immersed in the liquid, a second transducer situated out of the liquid and receiving the elastic pulse sent by the first transducer and transmitted by the guide, and electronic circuits for measuring the time elapsing between the transmission of an incident elastic pulse by the first transducer and the subsequent reception of the same elastic wave by the second transducer.

In the known level detectors of this type, the transmitting transducer is fixedly mounted close to the upper end of a magnetostrictive guide constituted by a metallic rod, whereas the receiving transducer is slidably mounted on the guide and is situated on a float, the position of which varies as a function of the level of the liquid to be measured.

This particular solution has several disadvantages. Indeed, it is necessary to use a flexible connection cable between the movable receiving transducer and the fixed mounted electronic circuits provided for detecting and processing the signal. The presence of electrical signals in the receiving transducer situated level with the liquid surface, may affect the safety of the system and in particular may create risks of sparks which, in certain conditions, and in particular if the liquid happens to be inflammable and volatile, as is the case for example with petrol, may lead to accidents.

In general, the presence of a floating detector inside the tank containing the liquid of which the level is to be measured, is not recommended since the detector is then placed inside an ambient atmosphere which may be corrosive or which may be subjected to temperatures capable of affecting its integrity.

Radar systems with non-guided waves are also known to have been used heretofore, for measuring distances, but these systems are expensive, also they have many disadvantages because of their sensitivity to the environment (mirage effect) and they are ill-adapted to distances below several hundreds or several tens of meters.

U.S. Pat. No. 2,713,263 further discloses an ullage measuring device using a pipe inserted within a tank and comprising a transducer mounted near the upper end of the pipe and being periodically energized so that radial compressional wave vibrations are induced in the pipe which travel longitudinally down the pipe and are reflected backwards along the pipe by the liquid surface to be detected as echoes by the transducer.

According to this U.S. patent, a series of equally spaced radial slots or notches are cut in one wall of the pipe to create discontinuities and reflect a portion of the energy travelling down the pipe. The notches thus serve as calibration markers. Such a device has not proved satisfactory since numerous parasitic echoes are produced by the notches. In particular, each echo reflected by a notch is also reflected by the other notches and the echo reflected by the liquid surface is also reflected by all the notches. Therefore, interferences occur and it is difficult to discriminate a useful signal. The superposition of a series of parasitic echoes may create a signal the amplitude of which is higher than the signal corresponding to the echo reflected by the liquid surface. Besides, if the liquid is mud or contains solid particles in suspension, the notches may retain solid particles which disturb the whole device.

It is the object of the present invention to overcome the aforesaid drawbacks and to permit the accurate and reliable measurement of liquid levels without having to use a movable detector in contact with the liquid of which the level is to be measured, and without having to use complex electronic circuitry to discriminate the useful signal.

A further object of the invention is to efficiently perform such measurements for a relatively low cost, on liquids contained in very high tanks or enclosures, even if the atmosphere on top of the liquid is very aggressive or if the liquid contains impurities.

These objects are reached according to the invention with a liquid level detector using guided elastic waves, of the type defined hereinabove, in which the elongated guide comprises at least one smooth tube having no roughness in the longitudinal direction, the second transducer is situated in a fixed position close to the first transducer so as to receive the elastic pulse delivered by the first transducer after reflection thereof on the surface of the liquid in which is immersed the lower part of the guide, and the first transducer is arranged in such a manner with respect to the guide that periodical radial deformations of the tube are antisymmetrically created essentially in a first axial plane of the guide whereas the radial deformations created in a second axial plane of the guide perpendicular to said first axial plane are substantially equal to zero.

The radial antisymmetrical deformations of the guide are constituted by deformations according to a flexion mode which are alternately created in two opposed directions within the first axial plane but are always created simultaneously in the same direction in two opposed walls of the guide.

According to a first embodiment of the invention, the guide comprises a first guide section of which the upper end carries the first transducer while the other end is immersed into the liquid, and a second guide section parallel to the first, but separate thereof, of which one upper end near the upper end of the first guide section carries the second transducer while its lower end is immersed in the liquid.

According to another more compact embodiment of the invention, the guide is constituted by only one longitudinal metallic element of which the upper end carries the fixed first and second transducers while the lower end is immersed in the liquid.

In order to increase detection response, hence level measurement accuracy, according to one particular feature of the invention, the first transducer comprises a plurality of elements, electrically mounted in parallel and placed on the guide in predetermined spots defining a code with a view to generating a succession of elastic pulses, and the second transducer comprises a plurality of elements electrically mounted in parallel and placed on the guide in predetermined spots defining the response to the code defined by the first transducer so as to perform an autocorrelation of the signal delivered by the first transducer.

According to an advantageous and particularly simple and inexpensive embodiment of the invention, the first and second transducers are constituted by a single transducer.

In this case, the electronic circuits for measuring the time elapsing between the transmission of an incident elastic pulse by the transducer and the subsequent reception, by the transducer, of the same elastic wave guided and reflected by the liquid-guide interface, further comprises gates for guiding the electric pulses applied to the transducer or issued therefrom.

According to another particular feature of the invention, the part of the incident elastic wave reflected by a fixed end of the guide is applied to a corrective measurement device or to a guide integrity control device.

Figure 3:
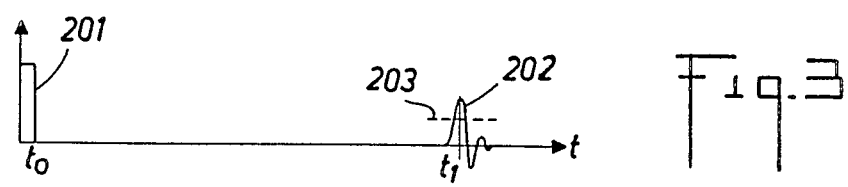
Figure 4:
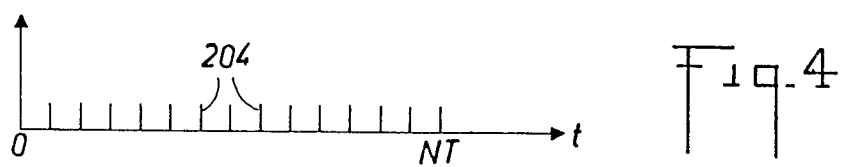
Figure 5:
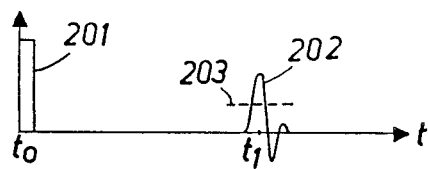
Figure 6:
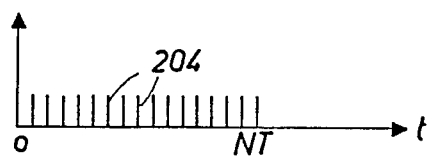
Figure 7:
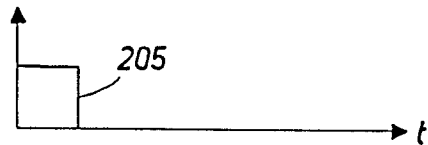
Figure 8:
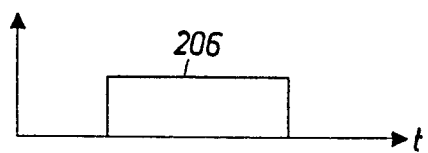
Figure 11:
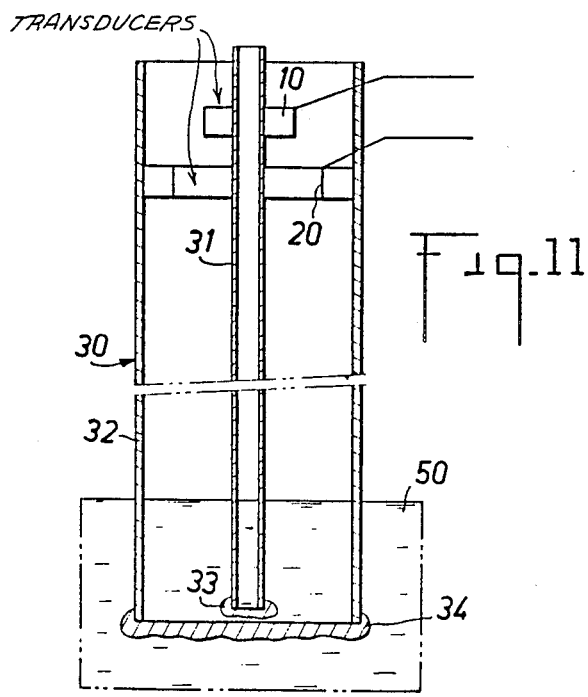
Figure 12:
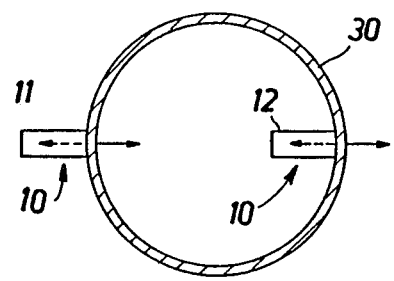
Figure 13:
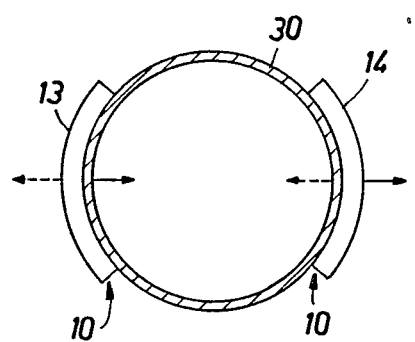
Figure 14:
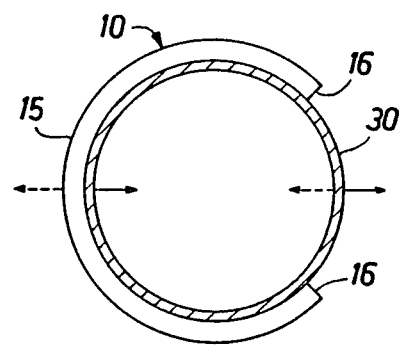

The invention will be more readily understood on reading the following description, with reference to the accompanying drawings, in which:

FIG. 1 is a diagrammatical overall view of a first embodiment of the detector according to the invention, FIG. 2 is a diagrammatical overall view of a second embodiment of the detector according to the invention, FIGS. 3 and 4 are timing diagrams showing the signals available in different points of the electronic circuits of the detector of FIG. 1, FIGS. 5 to 8 are timing diagrams showing the signals available in different points of the electronic circuit of the detector of FIG. 2, FIG. 9 shows part of the detector of FIG. 1 with special transducers permitting an adapted filtering, FIG. 10 illustrates the shape of the pulses successively received by the receiving transducer of FIG. 9, FIG. 11 shows part of the detector of FIG. 1 with a possible variant design for the guide, FIGS. 12 to 14 show examples of piezoelectric transducers the shapes of which are adapted to create deformations in the tubular guide according to a preferred propagating mode of the elastic waves, FIG. 15 is a diagrammatical view in axial section of a tubular guide and of the deformation of the latter according to a preferred propagating mode of the elastic waves, FIGS. 16 and 17 are cross-sectional views taken along lines XVI—XVI and XVII—XVII of FIG. 15, and FIG. 18 is a cross-sectional view of a tubular guide equipped with a transducer according to a variant embodiment of the present invention.

Referring now to the Figures, the level detector using guided elastic waves shown in FIG. 1 essentially comprises a guide, 30 for example, a metallic guide produced in the form of a straight smooth tube without roughness. Guide 30 is placed vertically in the liquid 50 of which the level is to be measured, and which is contained in a tank 40 which may be either open or closed at its upper part.

A first transducer 10, of piezoelectric or magnetostrictive type, is provided at the upper end of guide 30, in order to generate therein an incident elastic pulse 61, or a train of elastic waves, when said transducer receives from a pulse generating circuit 71 at a time $t_o$, an electric pulse 201 (FIG. 3).

A second transducer 20, which may be of piezoelectric, magnetostrictive or even optical type, is placed on the guide 30 beneath the first transmitting transducer 10 and at a small distance $x_o$ thereof. Said second transducer 20 receives the part 62 of the incident elastic pulse 61, or of the train of incident elastic waves, reflected in the guide 30 by the guide 30—liquid 50 interface, namely by the top surface of the volume of liquid 50. The reflected elastic pulse 62 is converted into an electric signal 202 at a time $t_1$ (FIG. 3) by the receiving transducer 20. Said electric pulse 202 is applied to one of the inputs of a comparator circuit 75 of which the other input 76 receives a signal 203 defining a predetermined threshold. When transducer 20 has delivered a pulse 202 of amplitude exceeding the selected threshold 203, the comparator 75 issues a signal to control the closure of the counter 73 receiving the pulses 204 (FIG. 4), delivered by a clock 72, of duration T. Said clock 72 and counter 73 are in turn triggered by the circuit 71 at time $t_o$ when an electric pulse 201 is applied to the transmitting transducer 10. Initially zero-set counter 73 then counts the intermittent pluses 204 delivered by the clock 72 between initial time $t_o$ at which the transducer 10 issues an incident elastic wave 61 and final time $t_1$ at which the transducer 20 receives an elastic wave 62 reflected by the surface of the liquid 50. The total number N of pulses 204 counted during time interval $t_1 - t_o$ is recorded in a memory 74, then converted into liquid level information.

Given that speed V of the incident 61 and reflected 62 elastic pulses in the guide 30 is constant and known, as well as duration T of clock pulses 204 and distance $x_o$ between transmitting transducer 10 and receiving transducer 20, height h of the liquid 50 inside tank 40 can easily be worked out from the number N of pulses counted during time interval $t_1 - t_o$.

l is the distance transmitting transducer 10 and the bottom of tank 40, if $x_a$ is the distance between the level of the liquid and transmitting transducer 10, and if $x_r$ is the distance between the level of the liquid and the receiving transducer 20, the following relations are obtained:

$$x_a + x_r = VNT \qquad (1)$$

$$x_a - x_r = x_o \qquad (2)$$

Hence $$h = l - x_a = l - (VNT + x_o/2) \qquad (3)$$

Advantageously, an absorbing material 33 may be placed at the lower end of guide 30 near the bottom of tank 40, such material 33 absorbing that part of incident wave 61 which is not reflected on the surface of the liquid 50. It should however be noted here that the part of incident wave 61 which, without said absorbing material 33, would be reflected at the lower immersed end of guide 30, would only reach receiving transducer 20 with a slight delay, namely at a time after time $t_1$ of FIG. 3, and as such, would not affect the measurement, since counter 75 would already have been stopped at time $t_1$.

The echo constituted by the part of incident wave 61 reflected by the lower end of guide 30 can in effect be used, after detection by receiving transducer 20, to supply, by comparison of its time $t_2$ of detection with time $t_1$ of detection of the echo 62 reflected by the surface of the liquid 50, a redundant information of measurement or else a guide 30 integrity control information, any breakage of said guide causing a modification of the localization of the lower end of the guide.

FIG. 1 also illustrates a transmitting transducer 10 placed at the upper end of guide 30. According to a variant embodiment (such as illustrated for example in FIGS. 9 and 11), the transmitting transducer 10 may be placed at a short predetermined distance, beneath the upper end of guide 30. This makes it possible to use the incident elastic wave transmitted towards the top part of guide 30 (at the same time as wave 61 directed towards the bottom) and reflected at the upper end of said guide 30, in order to supply, with the help of receiving transducer 20 correction information which, for example, takes into account the ambient temperature. Indeed, the upwardly directed elastic wave reflected towards the receiving transducer 20 corresponds to a fixed reference path. The variation of the time interval between time $t_o$ at which the incident wave is transmitted and time $t_3$ at which the receiving transmitter 20 receives the wave reflected by the upper free end of guide 30, represents a variation in the physical conditions of the atmosphere above the liquid of which the level is to be measured. If such a correction measurement is required, the electronic circuits include an additional counter or a timing circuit in order to discriminate the first correction wave reflected by the surface of the liquid. In this particular embodiment, return time $t_3$ of the wave reflected by the upper part of the guide is in principle earlier than return time $t_1$ of wave 62 reflected by the surface of the liquid.

FIG. 2 shows another embodiment of level detector which, on the whole, is similar to that shown in FIG. 1, except that it comprises only one transducer 100 acting both as transmitting transducer 10 and receiving transducer 20 of the detector according to FIG. 1. In this particular embodiment, the functioning is very similar to that of the detector of FIG. 1 and the elements common to both detectors bear the same reference numbers. However, in the detector according to FIG. 2 having only one transducer 100, electronic gates 77 and 78 are advantageously interposed, one (gate 77) between pulse generator 71 and transducer 100 and the other (gate 78) between transducer 100 and comparator 75.

The functioning of the detector of FIG. 2 will be more readily understood with reference to the time diagrams of FIGS. 5 to 8.

At initial time $t_o$, the pulse generator 71 issues a pulse 201 which is applied through gate 77 then open (high level signal 205 in FIG. 7) to transducer 100 which, then, generates an incident elastic wave in guide 30. Simultaneously, clock 72 is actuated and sends intermittent pulses 204 of duration T to previously zero-set counter 73. Gate 78 remains closed while gate 77 is open (low level signal 206 in FIG. 8).

At time $t_1$, elastic wave 62 reflected by the surface of the liquid 50 is received by transducer 100 which sends an electrical pulse signal 202 transmitted to an input of the comparator 75 through the then open gate 78 (high level signal 206), whereas gate 77 is itself closed (low level signal 205).

Circuits 71 to 76 work absolutely identically in the case of FIGS. 1 and 2 and in the embodiment of FIG. 2 for which distance $x_o$ between the transmitting and receiving transducers is reduced to zero, relation (3) becomes simply:

$$h = l - VNT/2 \quad (2)$$

h, l, V, N and T having the same designations as hereinabove in equations (1) to (3).

The incident elastic wave 61 created in the guide 30 by the transmitting transducer 10 or 100 can be either with or without carrier frequency and can be more or less complex.

FIG. 9 gives a diagrammatical illustration of the case of transmitting transducer 110 and receiving transducer 120, each one constituted of a plurality of elements 111 to 113, 121 to 123, the object being to carry out, during the detection, an adapted filtering permitting an increase of the signal/noise ratio thereby increasing the range and response of the detector.

For example, transmitting transducer 110 comprises a plurality of individual transducers 111, 112, 113 mounted electrically in parallel along the guide 30 at intervals selected according to a code so as to generate a succession 161 of elastic pulses. The receiving transducer 120 is constituted of the same number of individual transducers 121, 122, 123 also mounted in parallel along guide 30 close to transducer 110, and at intervals selected so as to constitute a replica of the code of transmitting transducer 110. The succession 162 of elastic pulses reflected by the surface of the liquid successively reaches the different elements 121 to 123 of transducer 120 which outputs a series of pulses such as illustrated in FIG. 10. It is clear that the exact superposition of the succession 162 of reflected elastic pulses with the elements 121 to 123 gives a wide amplitude autocorrelation signal 208 whereas a partial superposition gives low amplitude pulses 207, 209.

FIG. 11 illustrates a variant embodiment of the detector of FIGS. 1 and 2 in which guide 30 is not in one piece but comprises a first tubular section 31 close to the upper end of which is placed the transmitting transducer 10, and a second tubular section 32, parallel and coaxial to the first 31 and at the upper part of which is placed receiving transducer 20. The lower ends of tubular sections 31 and 32 situated near the bottom of the tank containing the liquid 50 can be protected by absorbing materials 33, 34. In this particular example, coupling between the two tube sections 31 and 32 is achieved by the liquid 50. An incident elastic pulse is propagated through the tubular section 31 then, after reflection on the surface of the liquid 50, it returns partly in the form of a reflected wave into the second tubular section 32.

Said guide 30 and transducers 10, 20, 100 may be produced in very different ways.

Guide 30 may be in metal, such as for example duralumin, or it may be made of other material with a certain resiliency such as glass.

The tubular guide 30 preferably has a circular cross-section as shown on FIGS. 12 to 17. However, the tubular guide 30 may also have a rectangular cross-section, in particular a squared cross-section as illustrated on FIG. 18.

The length and section of guide 30 are adapted to the applications selected therefor. It should however be noted that the length of the guide may be a few tens centimeters just as it may be a few meters or a few tens meters to produce a liquid level detector adaptable in particular to large-sized tanks. The external and internal diameters of a tubular guide may be for example, 12 and 10 mm or 32 and 30 mm, but they can also be much longer if the guide itself is several meters long.

Transducers 10, 100, 110 which may be of the piezoelectric type, are arranged in such a manner that an elastic wave is emitted according to an antisymmetrical flexion (bending) mode. Such an antisymmetrical flexion mode is characterized by radial deformation of the guide 30 which propagates longitudinally down the guide 30 so that the guide 30 is deformed to exhibit the shape shown in broken lines on FIGS. 15 to 17 and bearing the reference 30a.

As illustrated on FIGS. 15 to 17, the tubular guide 30 is progressively deformed along its vertical axis ZZ' substantially to define a sine-shaped curve whilst essentially retaining the same cross-section. In contradistinction thereto, a symmetrical flexion mode would create nodes and bulges in the guide which would then have to expand and retract during the propagation of the elastic wave, thus reducing the sensitivity of the device.

The radial deformations of the guide 30 are essentially produced in a first axial plane containing the XX' axis of FIGS. 16 and 17 whereas the radial deformations are substantially equal to zero in a second axial plane which contains the YY' axis of FIGS. 16 and 17 and is perpendicular to the first axial plane.

The antisymmetrical flexion mode is advantageous inasmuch as the elastic waves may be reflected with a high amplitude at the interface between the guide 30 and the liquid within which the bottom part of the guide is immersed.

The transducer 10 (or 100) capable of generating such an antisymmetrical flexion mode may be made in various ways. However, it is essential that the transducer 10 simultaneously induces in diametrically opposed portions of the guide wall taken along the XX' axis, deformations which have the same direction. Thus, on FIGS. 12 to 14, the arrows in continuous lines show simultaneous deformations of two diametrically opposed wall portions of the guide towards the right and the arrows in broken lines show simultaneous deformations of the same wall portions towards the left which are delayed with respect to the deformations towards the right.

As shown on FIG. 12, the emitting transducer 10 may comprise a pair of piezoelectric bars 11, 12 which are placed on diametrically opposed wall portions of the guide 30 and are suitably polarized to periodically deform the wall portions of the guide in the direction of the continuous arrows and in the direction of the broken arrows. The bars 11, 12 may be located inside or outside the guide 30 or partly inside the guide 30 and partly outside the guide 30 as shown on FIG. 12.

FIG. 13 shows an emitting transducer 10 comprising a pair of elementary curved piezoelectric bars 13, 14 which have substantially the same curvature as the circular cross-section of the cylindrical guide 30 and extend over about one fourth of the perimeter of the circular cross section of the guide. The curved elementary transducers 13, 14 may be placed outside the guide 30 on two diametrically opposite wall portions of the guide 30 and have the same function as the bars 11, 12 of FIG. 12.

FIG. 14 shows another embodiment 4 for the emitting transducer 10 which comprises a single piezoelectric member having a C-shape. The central curved portion 15 and the end portions 16 of the C-shaped transducer 10 of FIG. 14 create in the guide 30 an antisymmetric elastic wave which is substantially of the same type as the antisymmetric elastic waves created by the transducers 10 of FIGS. 12 and 13. The C-shaped transducer 10 may extend over substantially three quarters of the periphery of the tubular guide 30.

FIG. 18 illustrates another embodiment wherein the tubular guide 30 has a rectangular cross-section which can be a square cross-section. In such a case the emitting transducer 10 may comprise a pair of elementary piezoelectric linear bars 17, 18 which can be analogous to bars 11, 12 of FIG. 12 and are located on two opposed faces of tubular guide 30. The piezoelectric elements 17,18 are polarized to create deformations of said two opposed faces in a direction XX' perpendicular to said faces alternately towards the right and towards the left on FIG. 18.

It will be noted that the relative location of emitting transducer 10 and receiving transducer 20 on FIG. 1 can be modified without affecting the quality of the detection.

FIG. 1 shows an emitting transducer 10 which is located above a receiving transducer 20 and discriminating electronic means for disregarding the initial pulse 61 which reaches the receiving transducer 20 before the echoed pulse 62 reflected by the liquid surface.

It is possible to avoid the use of such discriminating electronic means by placing the receiving transducer at the top of the guide 30 above the emitting transducer 10 and by choosing an emitting transducer 10 which is adapted to be unidirectional, i.e. which is designed to emit an elastic wave towards the bottom of the guide only.

Such a unidirectional emitting transducer may be constituted by two superposed emitting transducers such as the transducers of FIGS. 12 to 14 which may each comprise a single C-shaped transducer (FIG. 14) or a pair of elementary transducers (FIGS. 12, 13). The two superposed transducers are arranged along the ZZ' axis of the tubular guide 30 and are spatially separated by a distance equal to $\lambda/4$ where $\gamma$ is the wavelength of the emitted periodical waves. The wavelength may be equal for example to about 10 cm, which corresponds to a relatively slow propagating speed of the elastic waves in the guide and improves the quality of the detection. The electric signals applied to the two superposed emitting transducers spaced by a distance equal to $\lambda/4$ present a phase shift equal to $\pi/2$. Under such conditions, if the sign of the phase shift is adequate, the waves emitted towards the upper part of the guide by the two superposed emitting tranducers are added with a phase shift equal to $\pi$ and therefore compensate each other and cannot be detected by the receiving transducer 20 whereas the waves emitted towards the bottom part of the guide by the two superposed emitting transducers are synchronous and are added to define a single pulse of higher amplitude.

The level detector according to the invention is suitable for measuring liquid levels, but it is also suitable for measuring the level of semi-liquid or very viscous products, and also for measuring the level of certain granular products.

What is claimed is:

1. A liquid level detector using guided elastic waves, comprising a first transducer situated out of the liquid for emitting an incident elastic pulse which propagates in an elongated guide of which a lower part is immersed in the liquid, a second transducer situated out of the liquid for receiving the elastic pulse sent by said first transducer and transmitted by the guide, and electronic circuits for measuring the time elapsing between the emission of said incident elastic pulse by said first transducer and the subsequent reception of the same elastic pulse by said second transducer, the improvement wherein said elongated guide comprises at least one smooth tube having no roughness in the longitudinal direction, said second transducer is situated in a fixed position close to said first transducer so as to receive the elastic pulse delivered by the first transducer after reflection thereof on the surface of the liquid in which is immersed the lower part of the guide, and said first transducer is arranged in such a manner with respect to the guide that periodical radial deformations of the tube are antisymmetrically created by successive incident elastic pulses essentially in a first axial plane of the guide whereas the radial deformations created in a second axial plane of the guide perpendicular to said first axial plane are substantially equal to zero.

2. A detector as claimed in claim 1, wherein the guide comprises a first guide section having an upper end which supports said first transducer and a lower end which is immersed in the liquid, and a second guide section located parallel to said first guide section but separate thereof, said second guide section having an upper end which supports said second transducer located near the upper end of said first guide section and a lower end which is immersed in the liquid.

3. A detector as claimed in claim 1, wherein the guide is constituted by a single cylindrical tubular element having an upper end carrying said first and second transducers and a lower end immersed in the liquid.

4. A detector as claimed in claim 1, wherein said first transducer comprises a plurality of elements which are electrically mounted in parallel and are placed on the guide in predetermined spots defining a code to generate a succession of elastic pulses and said second transducer comprises a plurality of elements which are electrically mounted in parallel and are placed on the guide in predetermined spots defining a response to the code defined by said first transducer so as to perform an autocorrelation of the succession of elastic pulses delivered by said first transducer.

5. A detector as claimed in claim 1, wherein said first and second transducers are constituted by a single transducer.

6. A detector as claimed in claim 5, wherein the electronic circuits for measuring the time elapsing between the emission of said incident elastic pulse by said single transducer and the subsequent reception by said single transducer of the same elastic pulse after a propagation in the guide and reflection on the surface of the liquid, further comprises gates for guiding electric pulses applied to said single transducer or issued therefrom.

7. A detector as claimed in claim 1, wherein said first and second transducers are of the magnetostrictive or piezoelectric type.

8. A detector as claimed in claim 1, wherein the lower end of the guide which is immersed in the liquid is covered over with an absorbing material.

9. A detector as claimed in claim 1, wherein the guide has a cylindrical tubular shape with a circular cross-section and said first transducer is constituted by a C-shaped portion of a ring.

10. A detector as claimed in claim 1, wherein the guide has a tubular shape and said first transducer comprises at least one pair of elementary transducers located on two opposed faces of the tubular guide.

11. A detector as claimed in claim 1, wherein the part of the incident elastic pulse reflected by a fixed end of the guide which is picked up by said second transducer is applied to a corrective measurement device or to a device for controlling the guide integrity.

12. A detector as claimed in claim 1, wherein the guide is several meters long and the ratio between the largest transversal dimension of the guide and the guide length is less than about 1/100.

* * * * *